United States Patent [19]

Brown et al.

[11] 4,418,051
[45] Nov. 29, 1983

[54] PROCESS FOR PREPARING THALLIUM (III)

[75] Inventors: Richard A. Brown, Trenton; Lance R. Byers, East Windsor; Robert D. Norris, Cranbury, all of N.J.

[73] Assignee: FMC Corporation, Philadelphia, Pa.

[21] Appl. No.: 470,344

[22] Filed: Feb. 28, 1983

[51] Int. Cl.$^3$ ............................................. C01G 15/00
[52] U.S. Cl. ........................................ 423/592; 423/111
[58] Field of Search ............................... 423/111, 592

[56] References Cited

U.S. PATENT DOCUMENTS

| | | | |
|---|---|---|---|
| 3,399,956 | 9/1968 | Hirose et al. | |
| 3,436,409 | 4/1969 | Hill et al. | 423/111 |
| 3,641,067 | 2/1972 | Kruse | 260/348.5 L |
| 4,058,542 | 11/1977 | Rizkalla et al. | 423/111 |
| 4,113,756 | 9/1978 | Johnson | 423/111 |
| 4,115,419 | 9/1978 | Naglieri et al. | 423/111 |
| 4,115,420 | 9/1978 | Brill | 423/111 |
| 4,115,421 | 9/1978 | Brill | 423/111 |
| 4,146,545 | 3/1979 | Leonard | 260/348.24 |
| 4,192,814 | 3/1980 | Johnson | 423/111 |
| 4,226,790 | 10/1980 | Walker | 260/429 R |

OTHER PUBLICATIONS

Rabe, O., "Thalliumoxyde", *Z. Anorg. Chem.*, 48, (1906), pp. 427 to 440.
Mellor, J. W., *A Comprehensive Treatise on Inorganic and Theoretical Chemistry*, vol. V., Longmans, Green & Co., NY, (1956), pp. 433 to 436.

*Primary Examiner*—Herbert T. Carter
*Attorney, Agent, or Firm*—Richard E. Elden; Eugene G. Horsky

[57] ABSTRACT

A process for converting a thallium (I) compound to a thallium (III) compound comprising contacting an alkaline solution of the thallium (I) compound with gaseous oxygen and in the presence of a peroxygen compound.

20 Claims, 1 Drawing Figure

SYNERGISTIC EFFECT OF HYDROGEN PEROXIDE FOR OXIDATION OF THALLIUM (I) TO THALLIUM (III) WITH OXYGEN

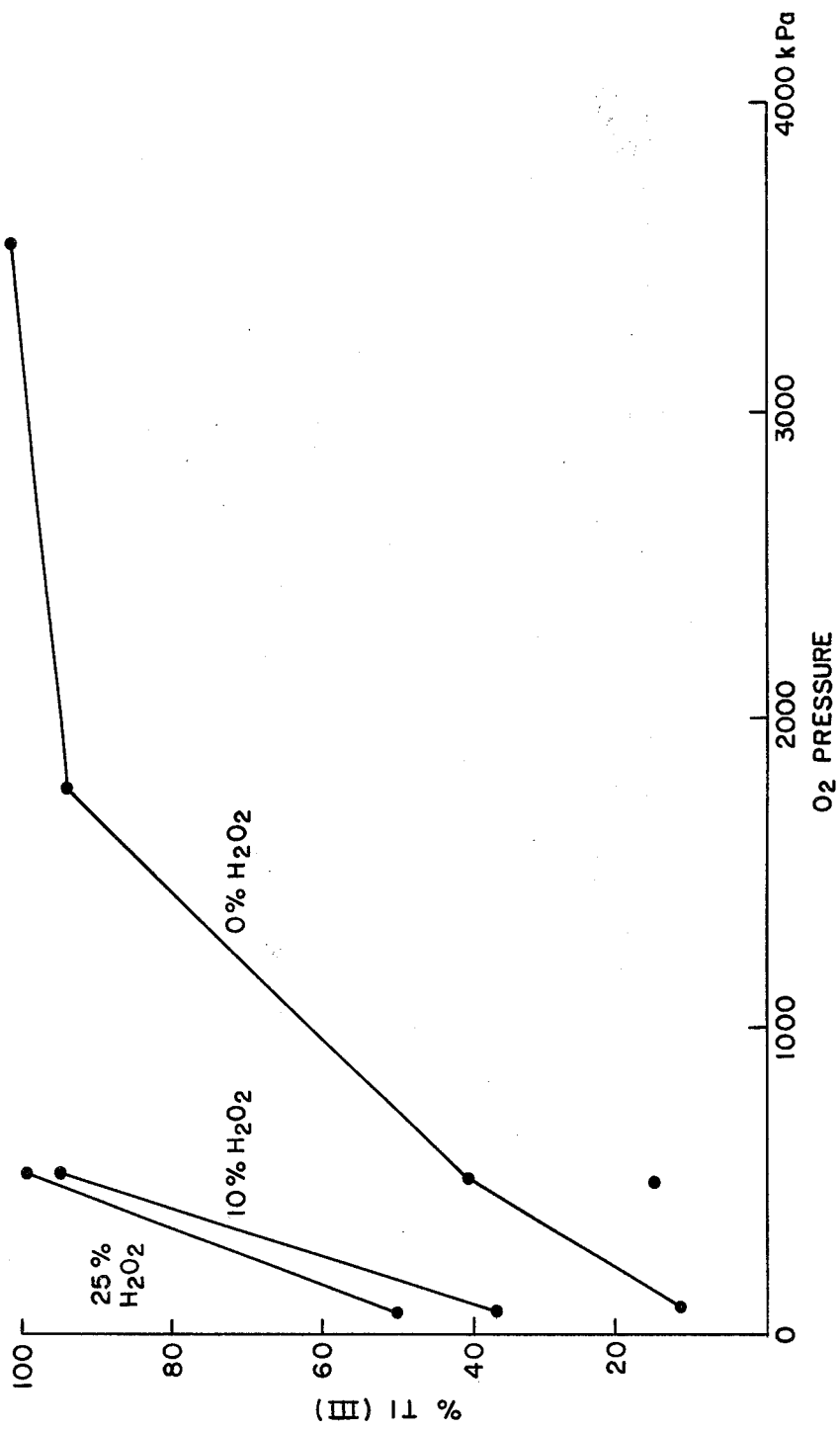

PROCESS FOR PREPARING THALLIUM (III)

This invention relates to the oxidation of thallium(I) compounds to thallium(III) compounds.

Oxythallation reactions are well-known and are described in the literature. These reactions involve the addition of an inorganic thallium(III) salt to an unsaturated organic substance, such as an olefin, acetylene, ketone, or aldehyde. In U.S. Pat. No. 3,641,067, Kruse discloses the use of a thallic carboxylate, such as thallic acetate, to oxidize olefins in an acid solution to the corresponding epoxides. For such a process to be practical, it is necessary to find an economic method to oxidize thallium(I) to thallium (III) so that thallium values can be recycled.

Peroxygens are known to oxidize thallium(I) compounds to thallium(III) compounds. As early as 1906, Rabe reported in *Zeit. Anorg. Chem.*, 48 (1906) pages 427 to 440 that 100% excess of hydrogen peroxide was effective in oxidizing thallium(I) to thallium(III) in the pH range of 10.3 to 13.8. However, the requirement of 100% excess of hydrogen peroxide makes the process of Rabe uneconomical for the commercial preparation of thallium(III) compounds; even the requirement of a stoichiometric quantity of hydrogen peroxide could make the use of hydrogen peroxide uneconomical for some applications.

The oxidation of thallium(I) to thallium(III) has been proposed using molecular oxygen according to the following: U.S. Pat. No. 3,399,956; U.S. Pat. No. 4,113,756; U.S. Pat. No. 4,115,419; and U.S. Pat. No. 4,192,814. The use of molecular oxygen generally requires the use of catalysts and promoters, elevated temperatures, and/or pressures in excess of 1000 kPa.

The present invention is directed to the development of a process for oxidizing thallium(I) to thallium(III) without the disadvantages of the prior art; this has been found to be possible by contacting a gas containing oxygen with an alkaline solution of a thallium(I) compound and hydrogen peroxide.

The presence of hydrogen peroxide has a synergistic effect on the oxidation of thallium(I) to thallium(III) by molecular oxygen eliminating the need of the very high pressures, the promoters, and the catalysts taught by the prior art. The hydrogen peroxide is effective even when present in less than a stoichiometric ratio to the thallium(I) to be oxidized. An increase in the ratio of hydrogen peroxide to thallium(I) increases the rate of oxidation and decreases the pressure of oxygen gas required. One skilled in the art will readily recognize that the optimum concentration of hydrogen peroxide to be used will vary according to the restraints of the system. For example, if rapid reaction rates at low oxygen pressures are required, the hydrogen peroxide concentration can be 25% of the stoichiometric quantity or even more. However, if minimum cost is desired and the reaction rate or degree of conversion is unimportant, concentrations of 10% of the stoichiometric quantity or less would be selected. As the proportional effect of hydrogen peroxide is greatest at the low increments, it will be obvious to one skilled in the art that as little as 1% of the stoichiometric quantity of hydrogen peroxide may be desirable under specific conditions.

Normally, the hydrogen peroxide concentration will decrease with time because of decomposition or because of consumption by chemical reactions. Therefore, it may be desired to add hydrogen peroxide either continuously or periodically in order to control the hydrogen peroxide concentration during the reaction time.

One skilled in the art will recognize that the presence of oxygen has an effect on the reaction rate and the conversion efficiency. While it is simpler and less expensive to operate with open equipment using oxygen at approximately atmospheric pressure, 100 kPa, the use of either higher or lower oxygen pressures can be beneficial. For example, air at 100 kPa will provide oxygen at a partial pressure of 20 kPa for a minimum cost for the oxygen but at the expense of lower conversion rates or higher hydrogen peroxide usage. On the other hand, very high oxygen pressures can be used. Moderate oxygen pressures are generally preferred, such as 100 kPa to 500 kPa.

Although the mechanism for this reaction is not known, the following explanation is convenient for explaining the preferred process for practicing the present invention: the most plausible initial step for the oxidation of thallium(I) by oxygen is the formation of thallium(II) which disproportionates to produce thallium(I) and thallium(III).

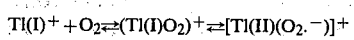

$$Tl(I)^+ + O_2 \rightleftharpoons (Tl(I)O_2)^+ \rightleftharpoons [Tl(II)(O_2.^-)]^+$$

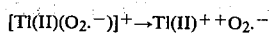

$$[Tl(II)(O_2.^-)]^+ \rightarrow Tl(II)^{++} + O_2.^-$$

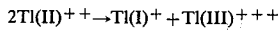

$$2Tl(II)^{++} \rightarrow Tl(I)^+ + Tl(III)^{+++}$$

The rate of such a reaction is probably limited by a greater propensity for the complex $[Tl(II)(O_2.^-)]^+$ to revert back to $Tl(I)^+$ and $O_2$ than to dissociate to $Tl(II)$ and superoxide. Hydrogen peroxide can then enhance the reaction by catalytically promoting the superoxide dissociation step through an ionic attack on the thallium(II) superoxide.

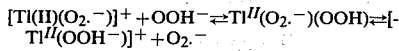

$$[Tl(II)(O_2.^-)]^+ + OOH^- \rightleftharpoons Tl^{II}(O_2.^-)(OOH) \rightleftharpoons [Tl^{II}(OOH^-)]^+ + O_2.^-$$

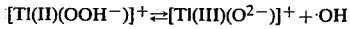

$$[Tl(II)(OOH^-)]^+ \rightleftharpoons [Tl(III)(O^{2-})]^+ + \cdot OH$$

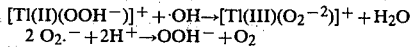

$$[Tl(II)(OOH^-)]^+ + \cdot OH \rightarrow [Tl(III)(O_2^{-2})]^+ + H_2O$$
$$2 O_2.^- + 2H^+ \rightarrow OOH^- + O_2$$

In this scheme, each $H_2O_2$ used to promote the reaction between thallium(I) and $O_2$ is regenerated from two superoxides. Thus, peroxide enhances the reaction of oxygen while not being consumed on a stoichiometric basis.

Other mechanisms can be developed which are consistent with the observations. In particular, free radical mechanisms are always an important consideration in peroxygen chemistry. In reality, the systems actual mechanism probably includes elements of both ionic and free radical pathways.

The proposed mechanism indicates that the experimental conditions are favorable for attaining synergism. First, at a high pH thallium(I) is more readily oxidized. Second, the high pH favors the formation of peroxygen anions which are the key to the ionic displacement of superoxide. It will be evident to one skilled in the art that it is desirable for the pH of the alkaline solution to be at least 9.6 to ensure the presence of peroxygen anions in the reaction mixture; it is preferable that the pH of the alkaline solution be at least 11.65, the $pK_a$ of hydrogen peroxide.

It will be obvious to one skilled in the art that the hydrogen peroxide can be supplied by the addition of any compound which will release hydrogen peroxide under the reaction conditions. Suitable compounds would include: perhydrates, such as sodium perborate; solid peroxides, such as calcium peroxide; persulfates or organic peroxygens, such as t-butyl hydroperoxide or peracetic acid.

The best mode of practicing the present invention will be obvious to one skilled in the art from the following non-limiting examples:

COMPARATIVE EXAMPLES

A. Ten millimols of thallium(I), 5.05 g $Tl_2SO_4$, were dissolved in 100 ml of 10 molar potassium hydroxide in a container which was vented to the atmosphere. Oxygen was bubbled through the solution for 6 hours at the rate of 3.3 cm$^3$/s. The thallium(I) conversion, the percent of thallium(I) converted to thallium(III), was found to be 10.2% at the oxygen pressure of 101 kPa.

B. Four solutions containing 10 millimols thallium(I) dissolved in 150 ml of 10 molar potassium hydroxide. The samples were exposed to oxygen at superatmospheric pressures for 6 hours. The percent conversion found at the respective pressures were: 17.5% and 41.5% at 506 kPa (av. 21.5), 92.7% at 1700 kPa, and 100% at 3475 kPa.

EXAMPLES

Example 1

Comparative Example A was repeated but in addition to oxygen at 101 kPa as in comparative Example A, four equal increments of 12.5 ml of 20% hydrogen peroxide were added after 0, 1, 2, and 3 hours, a total of 10% of the stoichiometric quantity. The percent conversion after 6 hours was found to be 36.6%.

Example 2

Example 1 was repeated using four additions of 12.5 ml of 50% hydrogen peroxide or 25% of the stoichiometric quantity in addition to oxygen at 500 kPa. After 5 hours the percent conversion was found to be 49.9%.

Example 3

A pressure reactor was charged with 150 ml of 10 molar potassium hydroxide and 10 millimols of thallium(I) and pressurized with oxygen for 6 hours at 500 kPa. In addition, 10% of the stoichiometric hydrogen peroxide was added as in Example 1. The percent conversion at 500 kPa was found to be 94.2%.

Example 4

Example 3 was repeated with 25% of the stoichiometric hydrogen peroxide added (50% concentration). The percent conversion at 500 kPa oxygen pressure was found to be 100% after 6 hours.

Example 5

Example 4 was repeated without change and the percent conversion was found to be 97.4%.

From the above data, which have been plotted as FIG. 1, it is clear that even small quantities of hydrogen peroxide are effective in reducing the oxygen pressure to oxidize thallium(I) to thallium(III), or to increase the percent conversion (or rate of conversion) obtained at any pressure.

What is claimed is:

1. A process for converting a thallium(I) compound to a thallium(III) compound comprising contacting an alkaline solution of the thallium(I) compound with gaseous oxygen in the presence of an effective amount of a peroxygen compound.

2. The process of claim 1 wherein the pressure of oxygen is between 10 kPa and 500 kPa.

3. The process of claim 1 wherein the peroxygen compound is hydrogen peroxide.

4. The process of claim 3 wherein the pH of the alkaline solution is at least 9.6.

5. The process of claim 3 wherein the pH of the alkaline solution is at least 11.65.

6. The process of claim 2 wherein the peroxygen compound is hydrogen peroxide.

7. The process of claim 6 wherein the pH of the alkaline solution is at least 9.6.

8. The process of claim 6 wherein the pH of the alkaline solution is at least 11.65.

9. The process of claim 1 wherein the pH of the alkaline solution is at least 9.6.

10. The process of claim 1 wherein the pH of the alkaline solution is at least 11.65.

11. The process of claim 1 wherein 10% to 25% of the stoichiometric quantity of the peroxygen is added.

12. The process of claim 11 wherein the pressure of oxygen is between 10 kPa and 500 kPa.

13. The process of claim 3 wherein 10% to 25% of the stoichiometric quantity of hydrogen peroxide is added.

14. The process of claim 12 wherein the peroxygen compound is hydrogen peroxide.

15. The process of claim 12 wherein the pH is greater than 9.6.

16. The process of claim 12 wherein the pH is greater than 11.65.

17. A process for converting thallium(I) to thallium(III) by contacting an alkaline solution with a gas containing oxygen at a partial pressure of at least 10 kPa in the presence of an effective amount of a peroxygen composition.

18. The process of claim 17 containing 10% to 25% of a peroxygen composition.

19. The process of claim 17 wherein the pH of the solution is at least 9.6.

20. The process of claim 17 wherein the peroxygen composition is hydrogen peroxide.

* * * * *